(12) United States Patent
Robinson

(10) Patent No.: US 12,485,974 B2
(45) Date of Patent: Dec. 2, 2025

(54) MULTI-DIMENSIONAL LOAD STRUCTURE

(71) Applicant: Gemini Group, Inc., Bad Axe, MI (US)

(72) Inventor: Mark Robinson, Bad Axe, MI (US)

(73) Assignee: Gemini Group, Inc., Bad Axe, MI (US)

( * ) Notice: Subject to any disclaimer, the term of this patent is extended or adjusted under 35 U.S.C. 154(b) by 712 days.

(21) Appl. No.: 17/847,614

(22) Filed: Jun. 23, 2022

(65) Prior Publication Data

US 2022/0332374 A1 Oct. 20, 2022

Related U.S. Application Data

(63) Continuation-in-part of application No. 17/173,054, filed on Feb. 10, 2021, now Pat. No. 11,535,306, (Continued)

(51) Int. Cl.
*B62D 25/06* (2006.01)
*B32B 3/12* (2006.01)
(Continued)

(52) U.S. Cl.
CPC ....... *B62D 25/2054* (2013.01); *B62D 29/043* (2013.01); *B62D 33/046* (2013.01);
(Continued)

(58) Field of Classification Search
CPC ........ B62D 25/00; B62D 25/06; B62D 25/20; B62D 25/2054; B62D 29/00–048; B32B 3/12
(Continued)

(56) References Cited

U.S. PATENT DOCUMENTS 4,626,023 A 12/1986 Lutz
4,898,419 A * 2/1990 Kenmochi ......... B62D 25/2036
428/116

(Continued)

FOREIGN PATENT DOCUMENTS

CN 109789640 A 5/2019
EP 1524175 A2 4/2005
(Continued)

OTHER PUBLICATIONS

EESR; Application No. EP 19192430 Dated Dec. 17, 2019.
(Continued)

*Primary Examiner* — Gregory A Blankenship
(74) *Attorney, Agent, or Firm* — Brooks Kushman PC

(57) ABSTRACT

A load structure may include a first honeycomb layer, a second honeycomb layer, and/or an attachment feature. The second honeycomb layer may be connected to the first honeycomb layer. The attachment feature may be connected to at least one of the first honeycomb layer or the second honeycomb layer. A method of manufacturing a load structure may include providing a first honeycomb layer, a second honeycomb layer, and an attachment feature, disposing an adhesive layer onto at least one of the first honeycomb layer or the second honeycomb layer, connecting an attachment feature to the first honeycomb layer or the second honeycomb layer, and/or disposing the first honeycomb layer onto the second honeycomb layer.

19 Claims, 12 Drawing Sheets

Related U.S. Application Data which is a continuation of application No. 16/110,409, filed on Aug. 23, 2018, now Pat. No. 10,926,809.

(51) Int. Cl.
| | |
|---|---|
| *B62D 25/00* | (2006.01) |
| *B62D 25/20* | (2006.01) |
| *B62D 29/04* | (2006.01) |
| *B62D 33/04* | (2006.01) |
| B32B 17/06 | (2006.01) |
| C03C 17/32 | (2006.01) |

(52) U.S. Cl.
CPC .............. *B32B 3/12* (2013.01); *B32B 17/065* (2013.01); *B32B 2605/00* (2013.01); *B62D 25/00* (2013.01); *B62D 25/06* (2013.01); *C03C 17/322* (2013.01)

(58) Field of Classification Search
USPC .................... 296/187.03, 187.08, 187.12
See application file for complete search history.

(56) References Cited

U.S. PATENT DOCUMENTS

| | | | | |
|---|---|---|---|---|
| 4,981,735 | A * | 1/1991 | Rickson | F16B 39/225 |
| | | | | 428/338 |
| 5,002,334 | A | 3/1991 | Meiler et al. | |
| 5,518,796 | A | 5/1996 | Tsotsis | |
| 5,542,777 | A * | 8/1996 | Johnson | F16B 43/02 |
| | | | | 411/338 |
| 5,667,866 | A | 9/1997 | Reese, Jr. | |
| 5,819,408 | A * | 10/1998 | Catlin | B62D 21/15 |
| | | | | 296/205 |
| 6,474,724 | B2 | 11/2002 | Lemmon et al. | |
| 7,017,981 | B2 | 3/2006 | Strohmavr et al. | |
| 7,128,365 | B2 | 10/2006 | Kiesewetter et al. | |
| 7,165,362 | B2 | 1/2007 | Jobs et al. | |
| 7,311,216 | B2 | 12/2007 | Donnelly et al. | |
| 7,462,311 | B2 | 12/2008 | Kralik et al. | |
| 7,524,389 | B2 | 4/2009 | Elbs et al. | |
| 7,637,686 | B2 * | 12/2009 | Wood | F16B 5/01 |
| | | | | 403/77 |
| 7,798,565 | B2 | 9/2010 | John et al. | |
| 7,942,475 | B2 | 5/2011 | Murray | |
| 8,511,742 | B2 | 8/2013 | Legler et al. | |
| 9,090,148 | B2 | 7/2015 | Kiesewetter et al. | |
| 9,327,471 | B2 | 5/2016 | Legler et al. | |
| 9,440,679 | B2 | 9/2016 | Lee et al. | |
| 9,776,488 | B2 | 10/2017 | Bowles | |
| 10,155,542 | B2 * | 12/2018 | Gao | B62D 21/157 |
| 10,293,860 | B1 * | 5/2019 | Cooper | B62D 25/025 |
| 10,400,448 | B2 | 9/2019 | Gosling et al. | |
| 10,407,010 | B2 | 9/2019 | Tyan | |
| 10,429,006 | B2 | 10/2019 | Tyan et al. | |
| 10,793,201 | B1 * | 10/2020 | Johnston, VII | B32B 5/024 |
| 10,913,233 | B2 | 2/2021 | Dietz et al. | |
| 11,084,226 | B2 | 8/2021 | Poschner et al. | |
| 11,685,135 | B2 | 6/2023 | Baumann et al. | |
| 11,898,399 | B2 | 2/2024 | Sing | |
| 12,092,148 | B2 * | 9/2024 | Bingham | F16B 5/01 |
| 12,365,395 | B2 * | 7/2025 | Robinson | B62D 29/043 |

| | | | | |
|---|---|---|---|---|
| 2004/0104600 | A1 * | 6/2004 | Kiesewetter | B62D 25/06 |
| | | | | 296/191 |
| 2005/0001347 | A1 | 1/2005 | Kralik et al. | |
| 2005/0003208 | A1 | 1/2005 | Graf et al. | |
| 2005/0029839 | A1 | 2/2005 | Stemmer | |
| 2006/0000186 | A1 * | 1/2006 | Carlson | B29C 44/186 |
| | | | | 52/793.1 |
| 2006/0108716 | A1 | 5/2006 | Strohmavr et al. | |
| 2007/0101679 | A1 * | 5/2007 | Harthcock | B62D 29/002 |
| | | | | 52/782.1 |
| 2009/0160210 | A1 | 6/2009 | Legler et al. | |
| 2009/0230729 | A1 * | 9/2009 | Lusk | B62D 29/043 |
| | | | | 296/193.07 |
| 2009/0272436 | A1 | 11/2009 | Cheung | |
| 2010/0140984 | A1 * | 6/2010 | Murray | B60J 7/022 |
| | | | | 29/897.2 |
| 2011/0114741 | A1 | 5/2011 | Kaindl | |
| 2011/0226312 | A1 | 9/2011 | Bohm et al. | |
| 2011/0262703 | A1 | 10/2011 | Legler et al. | |
| 2011/0305869 | A1 * | 12/2011 | Pollak | B29C 41/08 |
| | | | | 428/116 |
| 2012/0104799 | A1 | 5/2012 | Danielson et al. | |
| 2012/0308768 | A1 | 12/2012 | Mishra et al. | |
| 2014/0265443 | A1 * | 9/2014 | Meaige | B62D 25/025 |
| | | | | 296/187.02 |
| 2015/0030485 | A1 | 1/2015 | Cadeddu et al. | |
| 2015/0137560 | A1 * | 5/2015 | Preisler | B32B 5/024 |
| | | | | 296/193.07 |
| 2015/0266433 | A1 * | 9/2015 | Lupini | B29C 61/04 |
| | | | | 264/343 |
| 2016/0263975 | A1 | 9/2016 | Bowles | |
| 2017/0157883 | A1 | 6/2017 | Sing et al. | |
| 2017/0240217 | A1 | 8/2017 | Storz et al. | |
| 2017/0297510 | A1 | 10/2017 | Lee et al. | |
| 2017/0334168 | A1 | 11/2017 | Dry | |
| 2018/0050580 | A1 | 2/2018 | Sviberg et al. | |
| 2020/0062320 | A1 * | 2/2020 | Robinson | B62D 25/2054 |
| 2020/0370578 | A1 * | 11/2020 | Osborne | B32B 5/02 |
| 2021/0284246 | A1 * | 9/2021 | Brandley | B62D 21/15 |
| 2021/0362441 | A1 | 11/2021 | Noma et al. | |
| 2022/0126927 | A1 * | 4/2022 | Kim | B62D 25/14 |
| 2022/0212449 | A1 | 7/2022 | Newcomb et al. | |
| 2022/0212725 | A1 * | 7/2022 | Robinson | B62D 33/046 |
| 2022/0250565 | A1 * | 8/2022 | Godthi | F16F 7/121 |
| 2022/0315110 | A1 * | 10/2022 | Ignes | B62D 29/046 |
| 2022/0332374 | A1 * | 10/2022 | Robinson | C03C 8/00 |
| 2023/0057344 | A1 * | 2/2023 | Foran | B32B 27/304 |
| 2023/0312023 | A1 * | 10/2023 | Johann | B62D 29/041 |
| | | | | 428/99 |
| 2024/0351636 | A1 * | 10/2024 | Ignes | B62D 25/04 |

FOREIGN PATENT DOCUMENTS

| | | |
|---|---|---|
| GB | 2531942 A | 4/2016 |
| JP | H08169057 A | 7/1996 |
| WO | 2010093328 A1 | 8/2010 |

OTHER PUBLICATIONS

Non-Final Office Action; related U.S. Appl. No. 17/700,712, filed Mar. 22, 2022, date of mailing Jul. 1, 2024, 30 pgs.
European Search Report, EP22182562, dated Oct. 6, 2022.

* cited by examiner

MULTI-DIMENSIONAL LOAD STRUCTURE

CROSS-REFERENCE TO RELATED APPLICATIONS

This application is a continuation-in-part of U.S. patent application Ser. No. 17/173,054, filed on Feb. 10, 2021, and which is a continuation of and claims priority to U.S. patent application Ser. No. 16/110,409, filed on Aug. 23, 2018, which issued as U.S. Pat. No. 10,926,809 on Feb. 23, 2021, both of which are hereby incorporated by reference in their entirety.

FIELD OF TECHNOLOGY

The present disclosure pertains to a multi-dimensional load structure that may be employed, for example, but not limited to, in a vehicle where a load is applied, such as a floor panel, roof panel, structural member, and the like, and a method of manufacturing thereof.

BACKGROUND

Load structures, i.e., structures configured to withstand loads, are employed in all different kinds of applications, including, but not limited to, in vehicles as floor panels, roof panels, and the like. These load structures are often made of a paper honeycomb and are typically formed as thin panels that have sections in which the contour and/or thicknesses vary. One method of forming the load structures is using corrugated wave board blocks that are shaped prior to processing. Another method of forming a load structure involves pre-molding the geometric shapes or features that add thickness, and then adding them to the main panel when it is formed. However, load structures formed from these methods may have unpredictable weak areas, which may affect the ability of the load structure to withstand loads in its normal application and use.

Accordingly, there exists a need for an improved multi-dimensional load structure and method of manufacturing thereof to increase efficiency and minimize costs of manufacturing.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present disclosure. Further, the embodiments set forth herein are not intended to be exhaustive or otherwise limit or restrict the claims to the precise forms and configurations shown in the drawings and disclosed in the following detailed description.

DETAILED DESCRIPTION

An exemplary multi-dimensional load structure may include a base panel having a tiered structure with an upper layer, a lower layer, and at least one interior layer therebetween. The load structure may also have a glass layer applied to at least surfaces of each of the upper layer, the lower layer, and the at least one interior layer not in contact with an adjacent layer. The load structure may further have a coating applied to the exterior of the glass layer. The at least one interior layer may be configured to withstand a greater compressive force than the upper layer and the lower layer and/or the upper layer and the lower layer may be lighter than the at least one interior layer. The load structure may be used in vehicle, aerospace, ship, cargo, building, furniture, and other applications in which a structure is required to handle a load.

An exemplary method for manufacturing a multi-dimensional load structure may include first assembling a lower layer, at least one interior layer, and an upper layer to form a tiered structure. The method may then include forming the tiered structure into a panel, and then applying a glass layer to surfaces of each of the upper layer, the lower layer, and the at least one interior layer not in contact with an adjacent layer. The method may then include applying a coating to the glass layer, and finally, trimming the panel into a final shape of the multi-dimensional load structure.

Figure 1A:
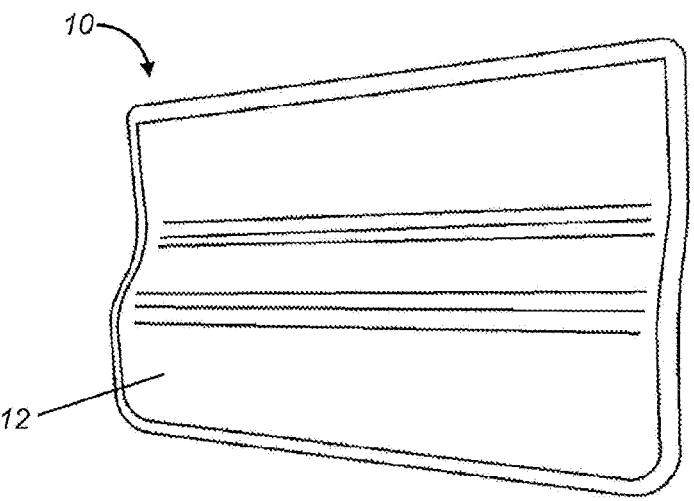
FIGS. 1A and 1B are perspective views illustrating an "A" side and "B" side of a multi-dimensional load structure according to one exemplary approach.
Figure 1B:
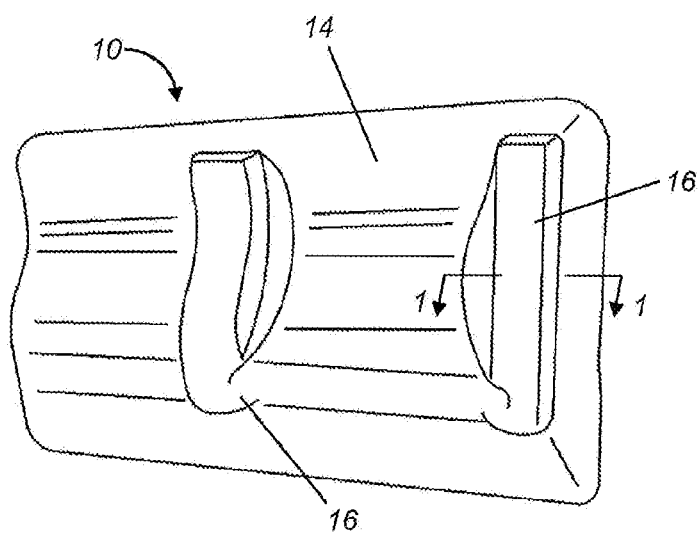
Figure 1C:
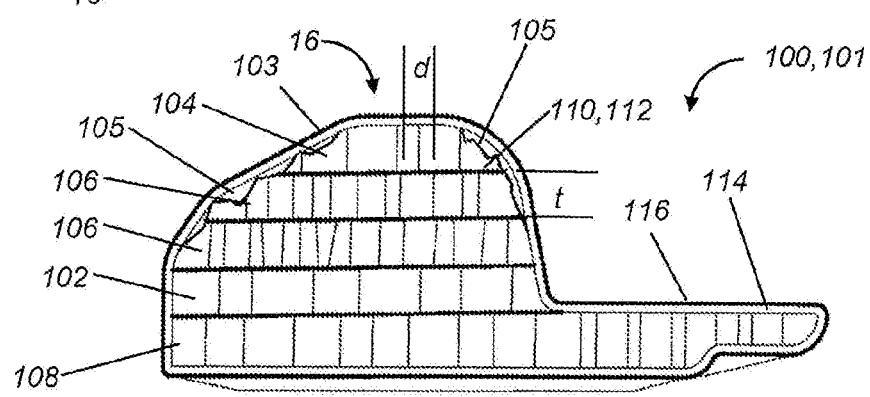
FIG. 1C is a partial, cross-sectional view, taken from line 1-1 of FIG. 1B, of the multi-dimensional load of FIGS. 1A and 1B.

Referring now to the figures, FIGS. 1A through 1C illustrate a multi-dimensional load structure 10 according to one exemplary approach. As can be seen in the figures, the load structure 10 may have varying contours and thicknesses. The sections 16 of the load structure 10 having increased thicknesses may be on a "B" side 14 of the load structure 10, as illustrated in FIG. 1B, which generally may not be visible or as readily visible, though it should be appreciated that such sections 16 may also be on an "A" side 12 of the load structure 10.

To achieve a structure with different thicknesses and/or having a curved profile 103, the load structure 10 may include a panel 100 having a tiered structure 101 in the areas of increased thickness and curved profile 103, as illustrated in FIG. 1C. The tiered structure 101 generally may have a lower layer 102, one or more interior layers 106, and an upper layer 104 stacked collectively on a base layer 108. Along the curved profile 103, the panel 100 may have deformed or crushed areas 105, where one or more of the layers 102, 104, or 106 may be deformed or crushed from its original structure during forming of the panel, as described in more detail hereinafter. While FIG. 1C illustrates two interior layers 106, it should be appreciated that there may be any number of interior layers 106, including just one. The load structure 10 also may have different numbers of interior layers 106 at different locations of the load structure 10 to form the desired shape and/or thickness. The layers 102, 104, 106, and 108 may or may not have the same thickness (t) as one or more of the other layers. Similar to the number of layers, the thicknesses of the layers may also be dependent upon the desired shape of the panel 100. For example, where the curved profile 103 has less of a slope, the thickness of the layers may be greater, and the quantity of layers may be less than areas where there is more of a slope. This may result in a smaller deformed or crushed area 105. The layers 102, 104, and 106 generally may be constructed such that the compressive force required to deform the interior layers 106 may be greater than that required to deform the lower and upper layers 102 and 104. Further, the lower and upper layers 102 and 104 may be lighter than the interior layers 106, which may help to ensure the center of the load structure, in particular, the interior layers 106, maintain structural integrity. Thus, the load structure 10 contemplates layers of varying sizes, shapes, and thicknesses.

The base layer 108 may have a layer of glass to stabilize the material of the layers at expansion during the forming process, which is described in more detail hereinafter, and to provide the fiber necessary for the composite which will form the skin of the "A side" 12 of the load structure 10. The base layer 108 generally may be large enough to accommodate handling through the forming process. The glass material may be oriented, woven, braided, random or any combination thereof, which may create the characteristics that the load structure 10 may require.

The layers 102, 104, 106, and 108 may be constructed of a material including paper, composite, thermoplastic, thermoset, or a combination thereof, and generally may have material properties required to form the panel 100. As merely one exemplary approach, one or more of the layers 102, 104, 106, and 108 may have at least one of a base weight ranging from 65 g/m2 to 212 g/m2, a density ranging from about 0.46 g/cm3 to 0.67 g/cm3, a Taber bending stiffness and (machine direction) ranging from about 1.66 gmf-cm to 61.03 gmf-cm, and a Taber bending stiffness rd (roll direction) ranging from about 0.73 gmf-cm to 23.6 gmf-cm. Each layer 102, 104, 106, and 108 may further have a honeycomb structure. The interior layers 106 generally may have a smaller cell construction than that of the lower and upper layers 102 and 104. As merely one example, the interior layers 106 may have a cell diameter (d) of 6 mm whereas the lower and upper layers 102 and 104 may have a cell diameter of 10 mm. The smaller cell construction of the interior layers 106 may allow for the greater compressive force required to deform the interior layers 106, as described above. The base layer 108 generally may be in contact with a forming tool along its entire surface. As such, the base layer 108 may be constructed with a 10 mm cell diameter honeycomb in one example.

The load structure 10 may also include paper layers 110 between each layer of the tiered structure 101. The paper generally may have a construction that may ensure that the compressive forces needed to form the panel are transferred through to the panel 100 from the forming tool, as described in more detail hereinafter, and force distortion of the paper to the outside of the panel 100. For example, the paper may be 4-40 lbs/ft$^2$, and may be, but is not limited to, kraft paper. The layers 102, 104, and 106 may be bonded together by an adhesive 112. The adhesive 112 may be water based or solvent based, and generally may be compatible with urethane, e.g., does not inhibit bonding of polyurethane to the paper, the inhibiting of bonding for which may result in fogging, odor, flammability, and the like.

The load structure 10 may also include a glass layer 114 around the panel 100. The glass may have a construction that is random, oriented, braided, woven, or any combination thereof. The load structure 10 may further have a coating 116 applied on and encapsulating the glass layer 114. The coating may be, but is not limited to, polyurethane, which may be rigid, and may be a foam, for example, 0.20 g/cc to 0.35 g/cc, or non-foaming. The amount of the coating 116 may be such that the weight is substantially equal to the weight of the glass layer 114 or as necessary to encapsulate deformed honeycomb structure.

Figure 2:
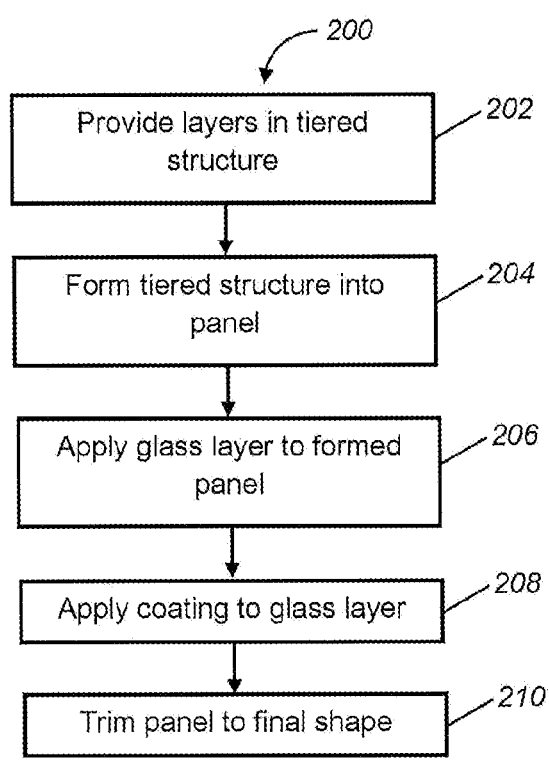
FIG. 2 is a schematic flow diagram of an exemplary method for manufacturing a multi-dimensional load structure.
Figure 3:
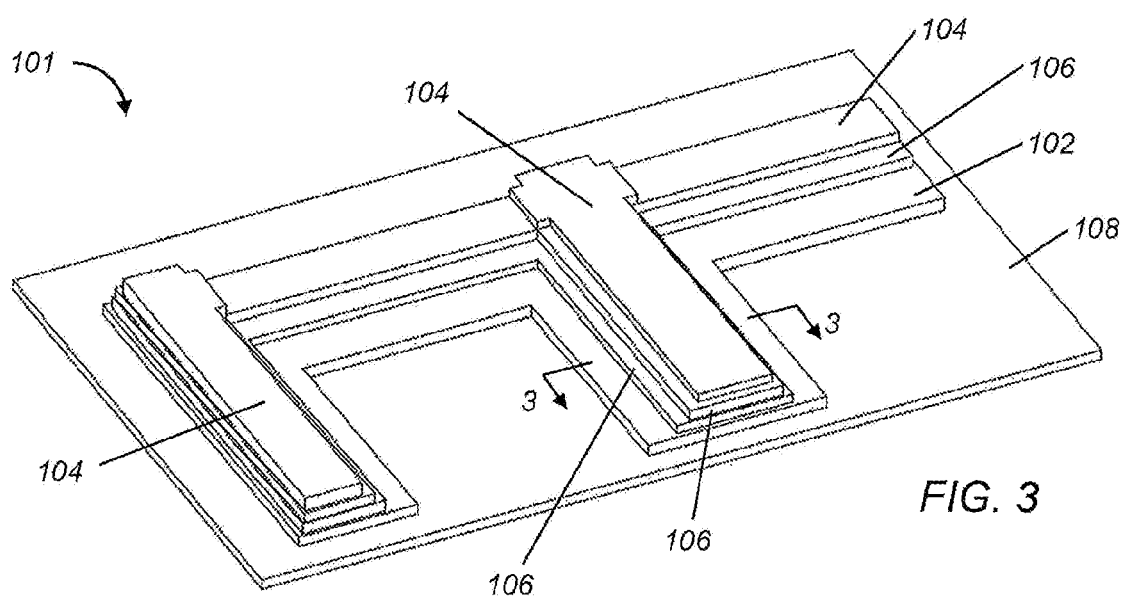
FIG. 3 is a schematic perspective view of a tiered structure of layers used to form the multi-dimensional load structure of FIGS. 1A and 1B.
Figure 5:
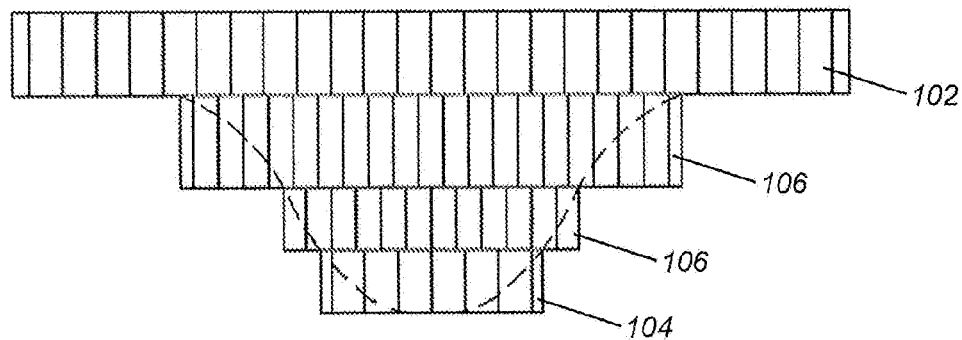
FIGS. 5-7 are schematic, partial cross-sectional views, taken from line 3-3 of FIG. 3, of the tiered structure of FIG. 3 through different steps of a forming process.

Referring now to FIG. 2, an exemplary method 200 for manufacturing a multi-dimensional load structure is illustrated. While method 200 is described hereinafter with respect to load structure 10, it should be appreciated that method 200 may be used to form any variations or embodiments of a load structure to which the steps are applicable. Method 200 generally may begin at step 202 in which the different layers, including, but not limited to, the lower layer 102, interior layers 106, and upper layers 104, may be assembled, for example, stacked, into a tiered structure 101 on a base 108 with a stepped configuration, as illustrated in FIGS. 3 and 5. It should be appreciated that the number of lower layers, upper layers, and interior layers may be the same or may be different, as illustrated, depending upon the final shape and profile of the load structure. As explained above, the layers 102, 104, and 106 may be a paper honeycomb structure, where the interior layers 106 generally have a smaller cell construction than that of the lower and upper layers 102 and 104 such that the compressive force required to deform the interior layers 106 may be greater than that required to deform the lower and upper layers 102 and 104.

Each layer may also have a paper layer 110 attached to one or more surfaces of the respective layer such that there may be a paper layer between each layer when assembled in the tiered structure 101. The paper layer 110 may be sized and located, i.e. to cover the respective surface to which the paper is attached, to be substantially equal to the area of contact between adjacent layers, where exposed surfaces of the layers do not have the paper layer. The layers with the paper layer 110 may be bonded to one another via an adhesive, which may be compatible with urethane, and may be water based or solvent based.

Figure 4:
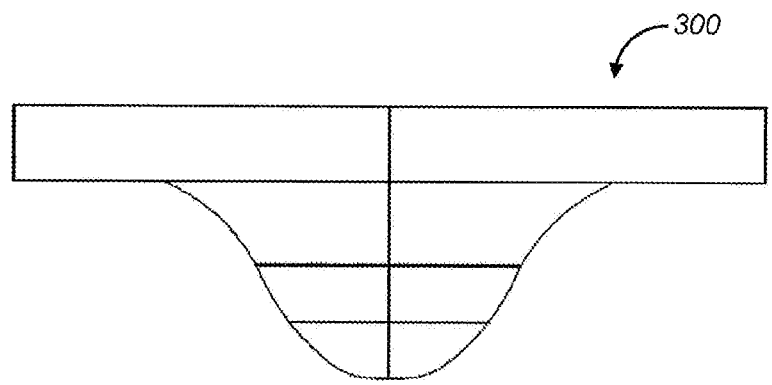
FIG. 4 is a schematic cross-sectional view of a preform mold used to shape the tiered structure of FIG. 3 into a panel.
Figure 6:
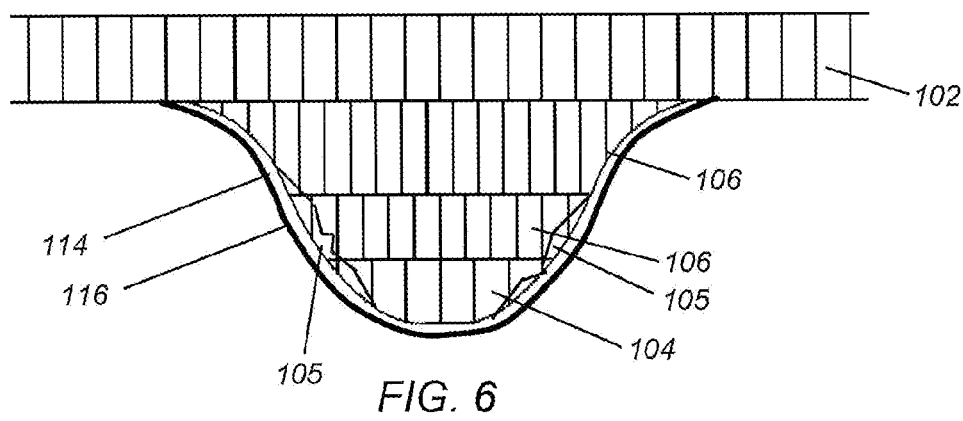
Figure 7:
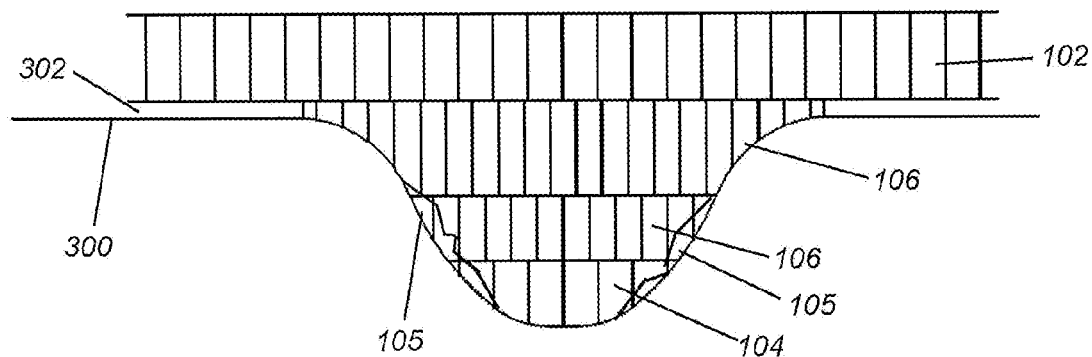

After step 202, method 200 may proceed to step 204 in which the tiered structure 101 may be formed into a panel 100, as seen in FIGS. 5 and 6. This may be done by preforming via a preform mold that defines the desired contour, i.e., has substantially the same shape as the final load structure. During such forming, one or more of the layers 102, 104, and 106 may be crushed, forming deformed or crushed areas 105, such that the tiered structure 101 may have the curved profile 103. A lower tool 300 according to one exemplary approach is illustrated in FIG. 4. When the preform mold is in an open position, the lower tool 300 may have a clearance 302 from a surface of one of the layers, as seen in FIG. 7. As merely one example, the clearance may be between 2 and 3 mm.

After step 204, method 200 may proceed to step 206 in which a glass layer 114 may be applied to the panel 100. Step 206 may include placing the glass material on the inside of the lower tool 300. The amount of glass material may be sized so as to cover the entire surface of the panel 100. As explained above, the glass material may be random, oriented, braided, woven, or any combination thereof. Any reinforcements and/or inserts needed may also be placed in the inside of the lower tool 300 at this time. Then, an adhesive may be applied, for example, by spraying, on the glass material in the lower tool 300 and/or on the panel. The adhesive generally may be urethane compatible. The preform mold may then be closed to allow the adhesive to cure.

After step 206, method 200 may proceed to step 208 in which a coating 116 may be applied to the glass layer 114. Additional material may also be added at this time to fill the geometry, where needed. As explained above, the coating 116 may be, but is not limited to polyurethane, which may be rigid and foaming or non-foaming, and the amount of coating may be such that the coating encapsulates the glass layer and has a weight that is substantially equal to the weight of the glass layer. To apply the coating 116, the panel 100 may be removed from the preform mold and placed on a load table designed to hold the panel 100 in a positive repetition. The panel 100 may then be picked off of a load station, which may be done via an end-of-arm-tool, which in turn may be attached to a robot that may transfer the panel 100 to a spray booth where the coating material, e.g., polyurethane, may be applied via spraying. The spraying may be accomplished using a fix mounted spray head or a moving spray head. The end-of-arm-tool may then transport the panel with the coating applied thereto, and transfer it back to a heated mold, which is closed and pressed until the coating has cross-linked. After the coating 116 has cured, the panel 100 may be removed from the press.

Method 200 may end at step 210 where the panel 100 may be trimmed. This may be performed via a matched steel tool, a rule die, in mold pinch, in mold by-pass, a waterjet cutting system, or the like.

The resulting panel 100 may result in a load structure 10 having varying compression, load, and performance characteristics based on a desired engineering performance behavior. Collectively, the layers 102, 104 and 106 may provide and be formed in to first, second, and/or third layers of a 3-D load structure 10 to create a composite sandwich that can have varying thicknesses, shapes, and/or densities, that may be tailored to unique product applications so as to provide enhanced performance characteristics. It will be appreciated that the number of layers can be 1-n. It will be further appreciated that the number of compound shapes can be 1-n, as is shown in exemplary FIG. 1B where at least two compound shapes are illustrated.

In general, the tiered structure of the panel is advantageous in that deformation of the layers, e.g., of the paper material of the honeycomb structure, during forming of the panel may occur on an outer periphery of the formed (molded) panel. The coating (polyurethane) may then encapsulate the deformed paper (in addition to the glass layer). This reduces the impact of the deformed paper on the structure of the final load structure, e.g., unpredictable weak areas.

In some example configurations, a load structure 10 (e.g., a panel 100 and/or a tiered structure 101) may include one or more attachment features 400. An attachment feature 400 may include one or more of a variety of shapes, sizes, materials (e.g., metal, polymer, among others), and/or configurations. For example and without limitation, an attachment feature 400 may include at least a fastener, an insert, a mount, a reinforcement, and/or a support structure/member, among others.

Figure 8:
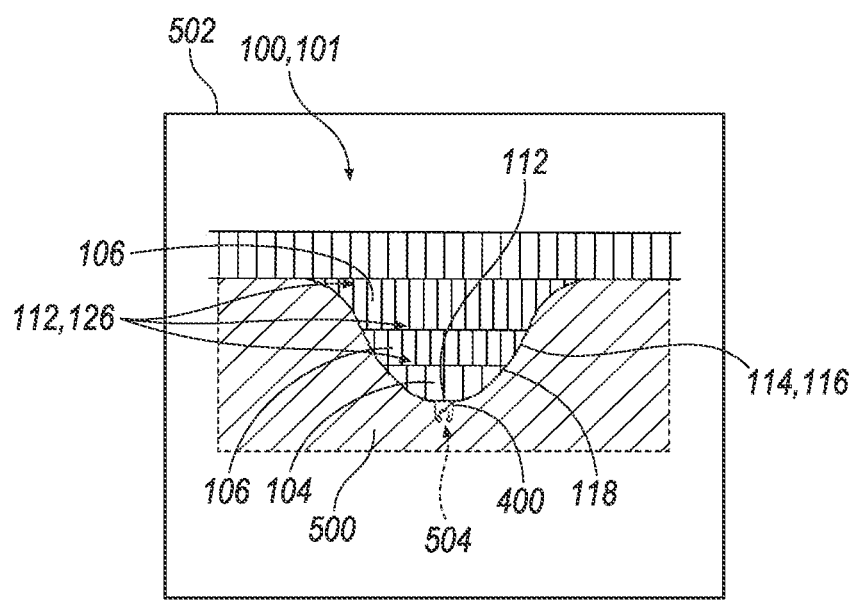
FIG. 8 is an alternative schematic, partial cross-sectional view of a tiered structure including one or more fasteners.
Figure 9:
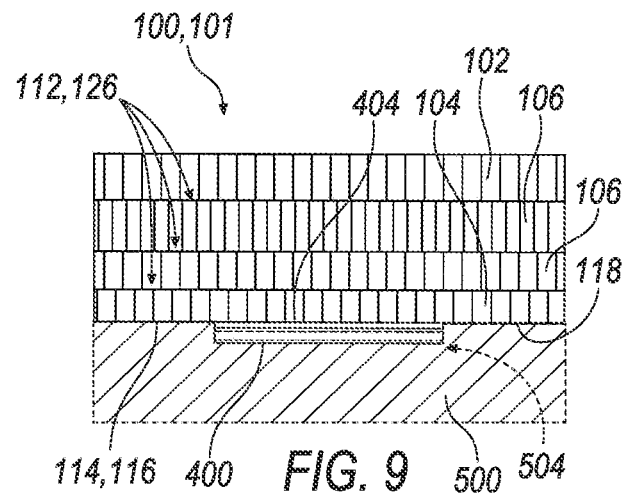
FIG. 9 is a side profile view of the FIG. 8 embodiment, showing a fastener on a surface of the structure.

With reference to FIGS. 8 and 9, a load structure 10 (e.g., a panel 100 and/or a tiered structure 101) may include one or more attachment features 400 (e.g., fasteners). In some example configurations, the attachment feature 400 may be connected (e.g., fixed) to an outer surface 118 of a tiered structure 101. The attachment feature 400 may, for example and without limitation, be connected to the outer surface 118 via an adhesive (e.g., 112), a glass layer (e.g., 114), and/or a coating layer (e.g., 116), among others. In some instances, the attachment feature 400 may be mounted, and/or connected to, and/or disposed adjacent to, and/or located on, at least one of a first honeycomb layer (e.g., 104), a second honeycomb layer (e.g., 106), a third honeycomb layer (e.g., 106), and/or a fourth honeycomb layer (e.g., 102).

In some examples, the attachment feature 400 may be configured to connect with an external object 500 such as to connect the load structure 10 with the external object 500. An external object 500 may, for example and without limitation, include a load structure, a panel, a surface, a portion, and/or a component of a vehicle, watercraft, aircraft, drone or other transportation construct 502, and/or may include a non-vehicle component, among others. In some implementations, the attachment feature 400 may be configured to connect with a corresponding connection feature 504 of the external object 500. For example and without limitation, a connection feature 504 may include a screw, a fastener, a rivet, a bolt, a pin, a structure, a component, an opening, a claw shaped portion, and/or a snap, among others.

In some example configurations, an attachment feature 400 may include a substantially C-shaped configuration (see, e.g., FIG. 8). In other examples, an attachment feature 400 may include an elongated configuration, such as a substantially rectangular configuration (see, e.g., FIG. 9) that may be affixed by adhesives, mechanically or via other methods to a surface 118 of the structure 100. An attachment feature 400 may comprise one or more metal materials and/or one or more plastic materials, a combination thereof, among others.

Figure 10:
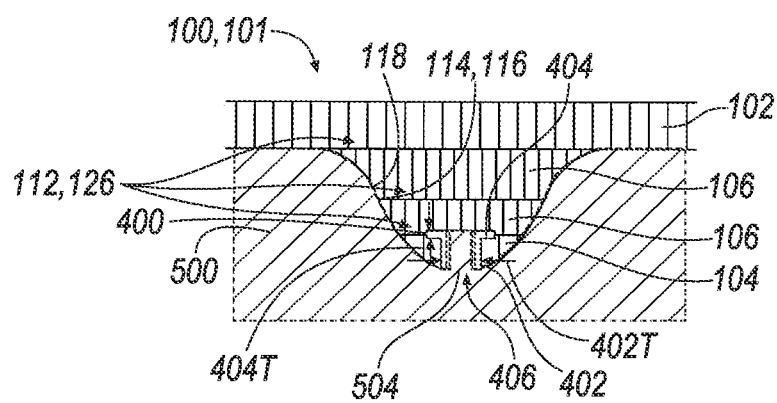
FIG. 10 is another alternative schematic, partial cross-sectional view of a tiered structure including at least one recessed fastener.

With reference to FIG. 10, in some example configurations, an attachment feature 400 (e.g., an insert) may include a first portion 402 and a second portion 404. In some instances, the first portion 402 and the second portion 404 may collectively define a T-shaped configuration. The first portion 402 may have a thickness 402T that is greater than a thickness 404T of the second portion 404. The thickness 402T of the first portion 402 may be equal to or less than the thickness 404T of the second portion 404.

In some implementations, a first portion 402 of an attachment feature 400 may be disposed (e.g., embedded) at least partially or entirely within a first honeycomb layer (e.g., 104) of the tiered structure 101. The first portion 402 may include an internal treaded portion 406 for receiving a fastener. In some examples, the threaded portion 406 may be exposed and/or accessible via an outer surface 118 of the tiered structure 101. The treaded portion 406 may be configured to connect with an external object 500 (e.g., a connection feature 504, vehicle part, any another member that would be desirable to be connected to the tiered structure 101).

In some example configuration, a second portion 404 of an attachment feature 400 may be enclosed within the tiered structure 101. For instance, the second portion 404 may be at least partially disposed between or within a first honeycomb layer (e.g., 104) and a second honeycomb layer (e.g., 106), or between or within the second honeycomb layer 106 and honeycomb layer 102.

Figure 11:
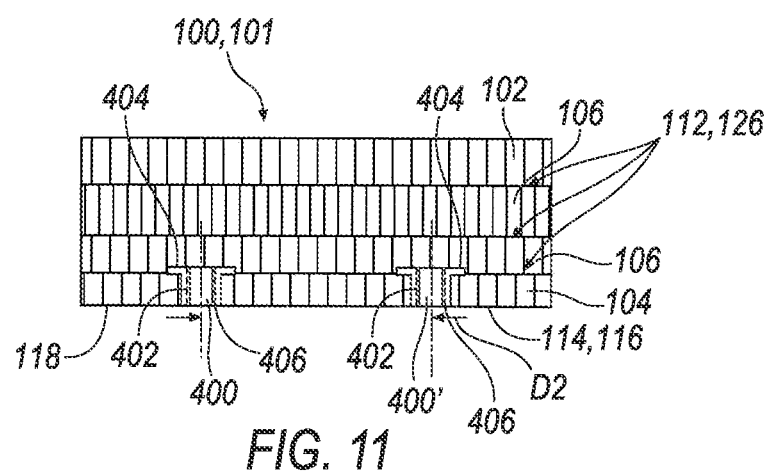
FIG. 11 is a side profile view of the FIG. 10 embodiment, showing a pair of fasteners.

Referring now to FIG. 11, a load structure 10 (e.g., a panel 100 and/or a tiered structure 101) may include more than one attachment feature (e.g., insert) such as a first attachment feature 400 and a second attachment feature 400' (e.g., an additional attachment feature). In some examples, a load structure 10 may include a plurality of attachment features, located along the side profile of the load structure 10 as just one example. In some example configurations, first portions 402 of the first attachment feature 400 and the second attachment feature 400' may be disposed (e.g., embedded) within a first honeycomb layer (e.g., 104). Second portions 404 of the first attachment feature 400 and the second attachment feature 400' may be disposed between the first honeycomb layer and a second honeycomb layer (e.g., 106). The second attachment feature 400' may be offset relative to first attachment feature 400 by a distance D2 along an outer surface 118 of a tiered structure 101. It will be appreciated that the attachment feature(s) may be located at the outer ends of the load structure 10 (not shown) as well as other locations.

With reference to FIGS. 12-15, in some example configurations, one or more attachment features 400 (e.g., support structures, reinforcement member(s)) may be disposed (e.g., embedded and/or enclosed) within a load structure 10 (e.g., a panel 100 and/or a tiered structure 101). The feature 400 helps reinforce the load structure 10. It will be appreciated that the feature 400 may be made of metal, composite, or any other structurally significant material that will enhance rigidity and/or strength. For instance, an attachment feature 400 may be disposed below an outer surface 118 of a tiered structure 101 (e.g., between and/or within honeycomb layers). It will be appreciated that an attachment feature 400 may be embedded with the load structure 10 at a location within each layer, or between each layer, and/or multiple features 400 may be located/inserted within a given load structure 10 (only one example is shown). The attachment feature 400 may or may not be exposed and/or accessible via the outer surface 118. The attachment feature 400 may be configured to add rigidity and/or structure to a load structure 10.

Figure 12:
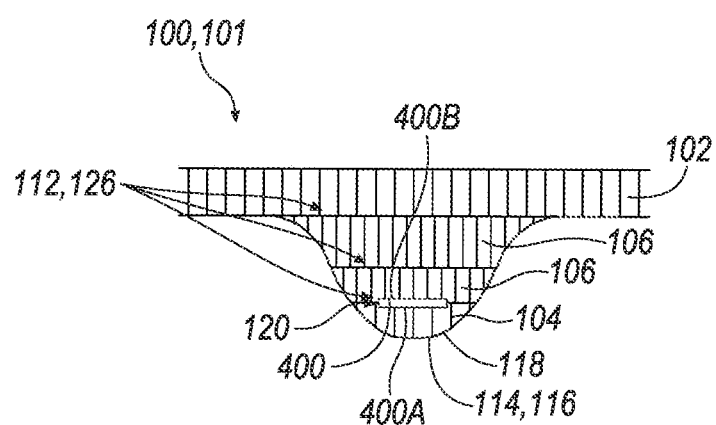
FIG. 12 is another alternative schematic, partial cross-sectional view of a tiered structure including a component within the structure.
Figure 13:
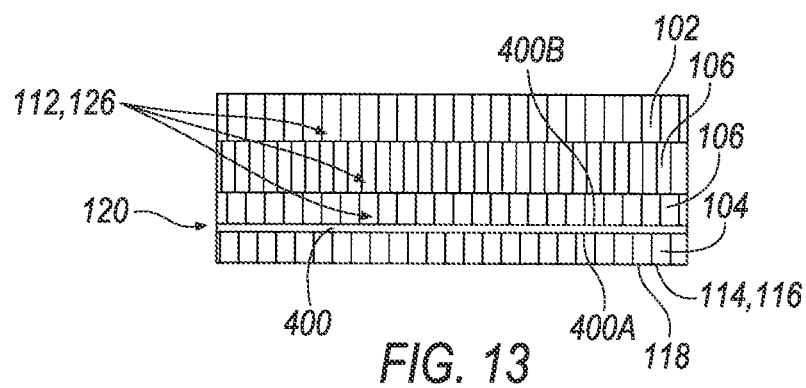
FIG. 13 is a side profile view of the FIG. 12 embodiment, showing an elongated component within the structure.

With reference to FIG. 13, in some examples, an attachment feature 400 may be disposed between a first honeycomb layer (e.g., 104) and a second honeycomb layer (e.g., 106). In some instances, an attachment feature 400 may have a substantially planar, elongated, and/or rectangular configuration (see, e.g., FIGS. 12, 13, and 15). An attachment feature 400 may cover only a portion of an area 120 between the first honeycomb layer and the second honeycomb layer (see, e.g., FIG. 12). An attachment feature 400 may cover at least a substantial portion of the area 120 (see, e.g., FIG. 13).

Figure 14:
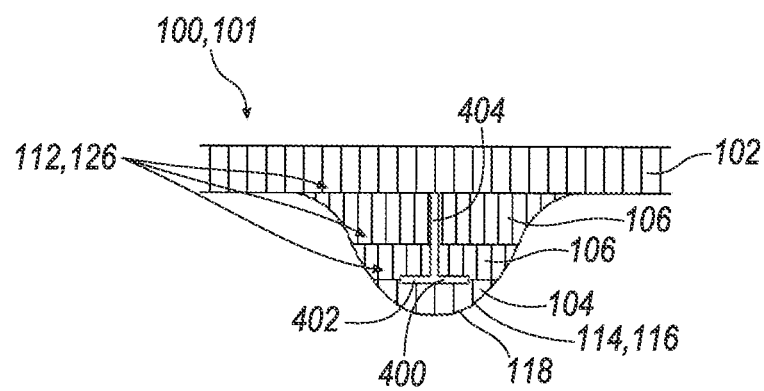
FIG. 14 is another alternative schematic, partial cross-sectional view of a tiered structure including a T-shaped component within the structure.

Referring now to FIG. 14, in some example configurations, an attachment feature 400 (e.g., a support structure) may include a first portion 402 and a second portion 404. The first portion 402 and the second portion 404 may collectively define a T-shaped configuration. The second portion 404 may be longer than the first portion 402 (as shown), or visa versa. The thickness of the portions 402 and 404 may be varied to meet performance characteristics. In some instances, the first portion 402 may be disposed between a first honeycomb layer (e.g., 104) and a second honeycomb layer (e.g., 106). The second portion 404 may be at least partially disposed (e.g., embedded) within the second honeycomb layer. The second portion 404 may be at least partially disposed within the second honeycomb layer and a third honeycomb layer (e.g., 106).

With reference to FIGS. 15 and 17-19, a load structure 10 (e.g., a panel 100 and/or a tiered structure 101) may include a void 122 disposed between a first honeycomb layer (e.g., 104) and a second honeycomb layer (e.g., 106). A void 122 may include one or more of a variety of shapes, sizes, and/or configurations. In some examples, at least a portion of an attachment feature 400 may be disposed within a void 122.

In some example configurations, a foam 124 may be disposed, molded, inserted or otherwise located between a first honeycomb layer and a second honeycomb layer. The foam 124 may be disposed within at least a portion of the void 122. The foam 124 may also fill the entire void 122. The foam 124 may be configured to add rigidity and/or strength to a load structure 10. For instance, the foam 124 may be used in load structures 10 that are exposed to frequent impacts and/or external forces. The foam 124 may be used in place of one or more honeycomb layers in a load structure.

The foam 124 may be a rigid foam or a semi-ridge foam, etc. The foam 124 may comprise a polystyrene, polyester, or a polyurethane material, among others. In some implementations, a foam 124 may include an expanded polystyrene (EPS) foam.

In some implementations, a paper layer 110 may be at least partially disposed between a first honeycomb layer (e.g., 104) and a foam 124. In some examples, a paper layer 110 may be disposed between a second honeycomb layer (e.g., 106) and the foam 124. A paper layer 110 may be attached to the first honeycomb layer and/or the second honeycomb layer via an adhesive. A paper layer 110 may be configured to block and/or prevent foam 124 from entering a honeycomb layer.

Figure 15:
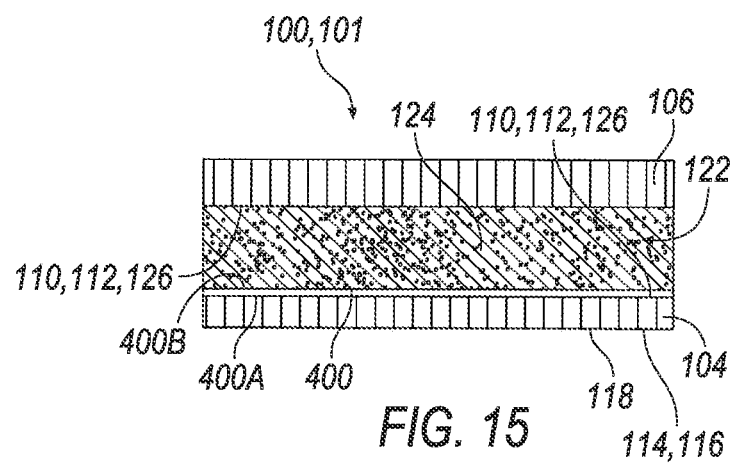
FIG. 15 is a side profile view of the FIG. 14 embodiment, showing the T-shaped component within the structure.
Figure 17:
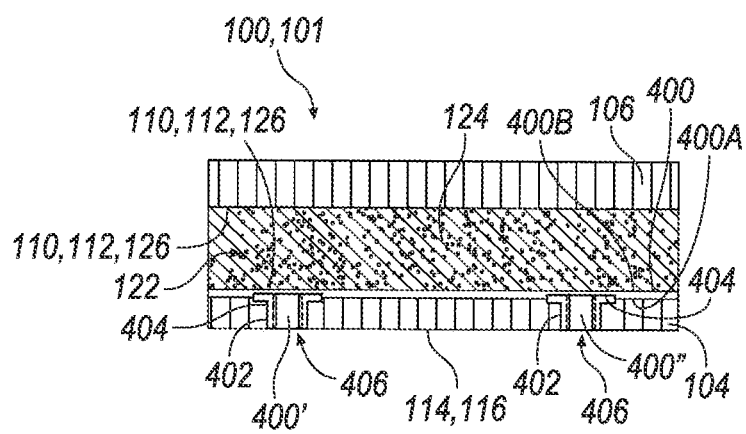
FIG. 17 is a side profile view of the FIG. 16 embodiment, showing the reinforcement member and fastener component within the tiered structure.

Referring now to FIGS. 15 and 17, an attachment feature 400 may include a first side 400A and a second side 400B spaced apart from the first side 400A. In some example configurations, at least a portion of the first side 400A may be in contact (e.g., at least indirectly) with a first honeycomb layer (e.g., 104). The second side 400B may face a void 122 and/or a foam 124. In some examples, at least a portion of the second side 400B may be in contact with and/or may be connected to the foam 124. It will be appreciated that the attachment feature 400 may be a single continuous component (as shown) or it may be segmented and located at various intervals along a length of the panel 100.

Figure 16:
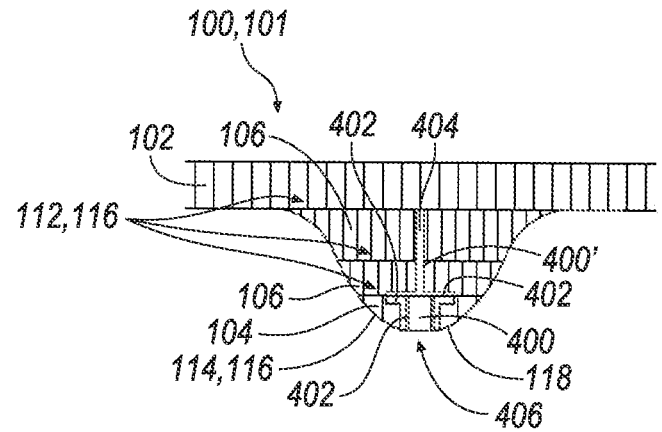
FIG. 16 is another alternative schematic, partial cross-sectional view of a tiered structure including a reinforcement member and a fastener component.

With reference to FIG. 16, in some example configurations, a load structure 10 (e.g., a panel 100 and/or a tiered structure 101) may include a first attachment feature 400

(e.g., an insert) and a second attachment feature 400' (e.g., a support structure, reinforcement member). The first attachment feature 400 may be accessible via an outer surface of the tiered structure 118 and the second attachment feature 400' may be disposed within the tiered structure 101. The first attachment feature 400 may be in contact with the second attachment feature 400', and/or they may be connected or otherwise affixed to one another. For instance, a first portion 402 of the second attachment feature 400' may be in contact with a second portion 404 of the first attachment feature 400. The first attachment feature 400 may be configured to connect with an external object (e.g., 500) and/or the second attachment feature 400' may be configured to add rigidity and/or structure to a load structure 10.

Referring now to FIG. 17, in some example configurations, a load structure 10 (e.g., a panel 100 and/or a tiered structure 101) may include a first attachment feature 400 (e.g., a support structure, reinforcement component), a second attachment feature 400' (e.g., an insert), and/or a third attachment feature 400" (e.g., an insert), among others. The first attachment feature 400 may be accessible via an outer surface 118 of the tiered structure 101 or it may be embedded within the structure 10. The second and third attachment features 400', 400" may be enclosed within the tiered structure 101 and/or located near the surface. The second attachment feature 400' and the third attachment feature 400" may be in contact with a first side 400A of the first attachment feature 400. In some instances, second portions 404 of the second attachment feature 400' and the third attachment feature 400" may be in contact with the first side 400A of the first attachment feature 400. First portions 402 and/or second portions 404 of second attachment feature 400' and the third attachment feature 400" may be at least partially disposed within a first honeycomb layer (e.g., 104). The second attachment feature 400' and the third attachment feature 400" may each include internal threaded portions 406 that may be configured to connect with one or more external objects and are accessible via the outer surface. The first attachment feature 400 may be configured to add rigidity and/or structure to a load structure 10.

Figure 18:
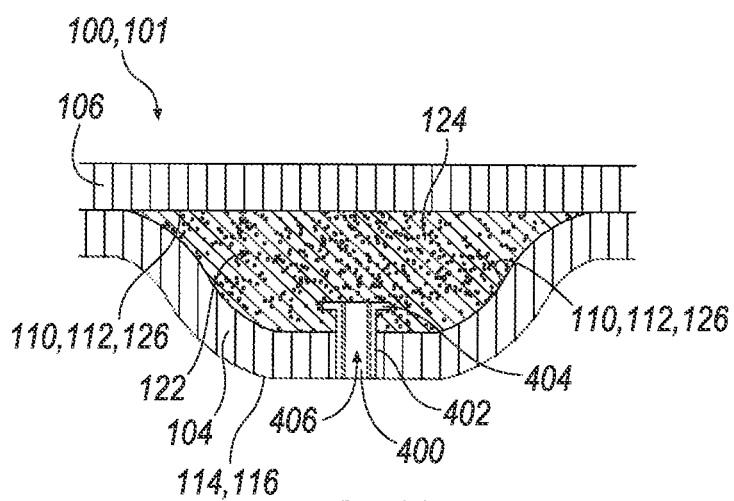
FIG. 18 is another alternative schematic, partial cross-sectional view of a tiered structure including a fastener component and a foamed cavity.
Figure 19:
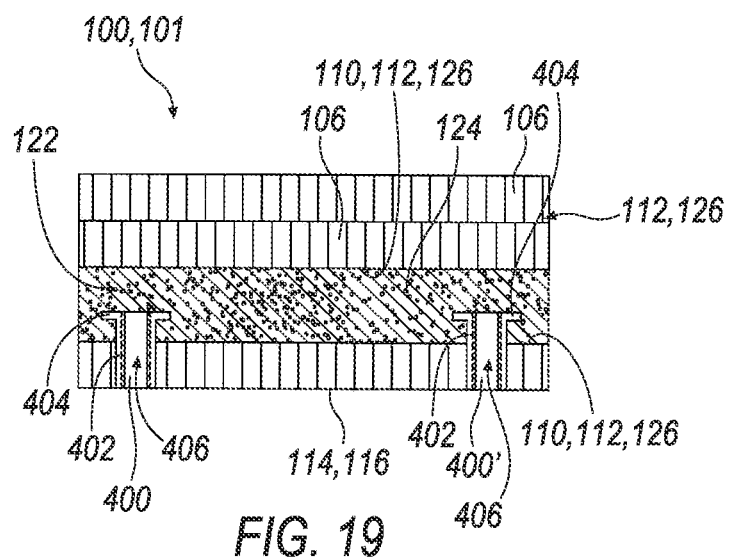
FIG. 19 is a side profile view of the FIG. 18 embodiment, showing the foamed cavity and a pair of fastener components.

With reference to FIGS. 18 and 19, in some example configurations, a load structure 10 (e.g., a panel 100 and/or a tiered structure 101) may include one or more attachment features such as an attachment feature 400 (e.g., an insert) and one or more additional attachment features 400' (e.g., an insert). A void/cavity 122 is disposed between the layer 106 and layer 104. Part of first portions 402 of the attachment feature 400 and the additional attachment feature 400' may be disposed (e.g., embedded) within a first honeycomb layer (e.g., 104). Additional portions of the first portions 402 of the attachment feature 400 and the additional attachment feature 400' may be disposed within void 122 where foam 124 could be located. Second portions 404 of the attachment feature 400 and the additional attachment feature 400' may be disposed within the foam 124.

Figure 20:
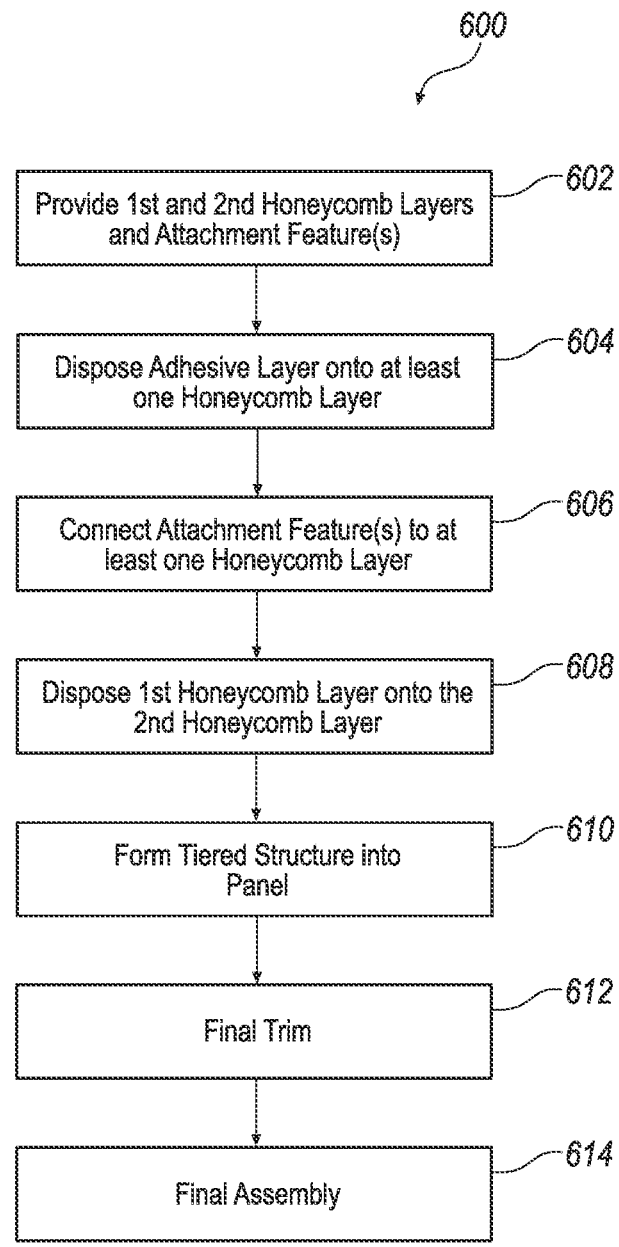
FIG. 20 is a schematic flow diagram of an exemplary method for manufacturing a multi-dimensional load structure including one or more fasteners.

Referring now to FIG. 20, a method 600 for manufacturing a load structure including one or more attachment features 400 (e.g., load structures of FIGS. 8-19) is illustrated. The method 600 may include steps that are substantially similar to the steps of method 200 except for certain differences that are disclosed below. The method 600 may include, but is not limited to, forming a tiered structure including providing at least a first and a second honeycomb layer and one or more attachment features 602, disposing an adhesive layer onto at least one of the first honeycomb layer or the second honeycomb layer 604, connecting at least one attachment feature to one of the first honeycomb layer or the second honeycomb layer 606, and disposing the first honeycomb layer onto the second honeycomb layer 608. It will be appreciated that other steps may be deployed.

Method 600 generally may begin at step 602 in which at least a first honeycomb layer (e.g., 104), a second honeycomb layer (e.g., 106), and one or more attachment features 400 are provided. In some examples, one or much honeycomb layers (e.g., a third honeycomb layer 106 and a fourth honeycomb layer 102, etc.) may be provided. The number of honeycomb layers may be dependent upon the desired final shape and profile of the load structure and/or the connection arrangement of the attachment features to the load structure. Step 602 may begin the process of forming a tiered structure 101 of the load structure 10. Step 602 may be similar to step 202 of method 200.

After step 602, the method 600 may proceed to step 604 in which an adhesive layer 112 is disposed onto at least one honeycomb layer. For example, an adhesive layer 112 may be disposed (e.g., sprayed, rolled, injected, etc.) onto one or more surfaces and/or portions of the first honeycomb layer, the second honeycomb layer, or the one or more additional honeycomb layers. In some example configurations, in addition to an adhesive layer 112, one or more intermediate layers 126 may be disposed onto the first honeycomb layer, the second honeycomb layer, or the one or more additional honeycomb layers. For example and without limitation, an intermediate layer 126 may include a fiberglass layer, a paper layer, and/or an adhesive layer, among others.

After step 604, the method 600 may proceed to step 606 in which one or more attachment features 400 may be connected to at least one honeycomb layer. For examples including load structures as illustrated in FIGS. 8 and 9, an attachment feature 400 (e.g., fastener) may be connected (e.g., fixed) to an outer surface of the first honeycomb structure (e.g., 104). An attachment feature 400 may be connected to the first honeycomb at least in part via an adhesive 112.

After step 606, the method 600 may proceed to step 608 in which the first honeycomb layer (e.g., 104) is disposed onto the second honeycomb layer (e.g., 106) such that an adhesive layer 112 and/or one or more intermediate layers 126 may be disposed between the first honeycomb layer and the second honeycomb layer. Step 606 may include connecting the second honeycomb layer with one or more additional honeycomb layers such that an adhesive layer 112 and/or one or more intermediate layers 126 are disposed between each respective honeycomb layer. The second honeycomb layer may be connected to the one or more additional honeycomb layers prior to or after being connected with the first honeycomb layer.

For examples including load structures as illustrated in FIGS. 10 and 11, a first portion 402 of an attachment feature 400 (e.g., an insert) may be embedded within a first honeycomb structure (e.g., 104) prior to the first honeycomb being connected with the second honeycomb layer. In some instances, the first portion 402 may be inserted and/or pierced through the first honeycomb layer. In some examples, a hole may be drilled and/or formed in the first honeycomb layer prior to the first portion 402 being disposed within the first honeycomb layer. After the first portion 402 has been disposed within the first honeycomb layer, the first honeycomb layer may be disposed onto and/or connected with the second honeycomb layer such that a second portion 404 of the attachment 400 is disposed and/or enclosed between the first and second honeycomb layers.

For examples including load structures as illustrated in FIGS. 12 and 13, an attachment feature 400 (e.g., a support structure) may be connected (e.g., fixed) to a first honeycomb layer or a second honeycomb layer (e.g., via an adhesive, etc.) prior to the first honeycomb layer being connected with the second honeycomb layer. After the attachment feature 400 has been connected with the first honeycomb layer or second honeycomb layer, the first honeycomb layer may be disposed onto and/or connected with the second honeycomb layer such that the attachment feature 400 is disposed and/or enclosed between the first and second honeycomb layers.

For examples including load structures as illustrated in FIG. 14, a second portion 404 of an attachment feature 400 (e.g., a support structure) may be inserted and/or pierced through a second honeycomb layer (e.g., 106) and/or a third honeycomb layer (e.g., 106) such that the second portion 404 is disposed (e.g., embedded) within the second and/or third honeycomb layers. After the second portion 404 has been disposed within the second and/or third honeycomb layers, a first honeycomb layer (e.g., 104) may be disposed onto and/or connected with the second honeycomb layer such that a first portion 402 of the attachment feature 400 is disposed and/or enclosed between the first and second honeycomb layers.

For examples including load structures as illustrated in FIG. 16, a first portion 402 of a first attachment features 400 (e.g., an insert) may disposed (e.g., pierced and/or inserted, etc.) within a first honeycomb layer (e.g., 104) and a second portion 404 of a second attachment feature 400' (e.g., a support structure) may be disposed (e.g., pierced and/or inserted, etc.) within a second honeycomb layer (e.g., 106) and/or a third honeycomb layer (e.g., 106). The second honeycomb layer and the third honeycomb may have been connected prior to the second portion 404 being disposed therein. Subsequently, the first honeycomb layer may be disposed onto and/or connected to the second honeycomb layer such that a second portion 404 of the first attachment feature 400 is in contact with a first portion 402 of the second attachment feature 400' and/or the second portion 404 of the first attachment feature 400 and the first portion 402 of the second attachment feature 400' are disposed between the first and second honeycomb layers.

For examples including load structures as illustrated in FIGS. 15 and 17-19, method 600 may include disposing a foam 124 within a load structure. For instance, the foam 124 may be disposed between a first honeycomb layer (e.g., 104) and a second honeycomb layer (e.g., 106). The foam 124 may be disposed between the first and second honeycomb layers after the one or more attachment features 400 have been connected to at least one of the honeycomb layers and/or after the honeycomb layers have been connected. The foam 124 may be injected into a void 122 disposed between a first honeycomb layer and the second honeycomb layer. In some example configurations, a passageway may be cleared through one of the first or second honeycomb layers such that the foam can be injected between the first and second honeycomb layers. The foam 124 may be injected via a tool (e.g., an injection gun, among others). In other examples, the foam 124 may be disposed onto the first honeycomb layer or the second honeycomb layer prior to the first and second honeycomb layers being connected.

After step 608, the method 600 may proceed to step 610 in which the tiered structure 101 may be formed in a panel 100. Step 410 may be substantially similar to and/or conducted in a similar manner as step 204 of method 200. In some examples, a glass layer 114 may be applied to the panel 100. The glass layer 114 may be applied to the panel 100 in a similar manner as step 206 of method 200. In some instances, a coating 116 may be applied to the glass layer 114. The coating 116 may be applied to the glass layer 114 in a similar manner as step 208 of method 200. In some example configurations, the glass layer 114 and/or the coating 116 may help facilitate the bonding of an attachment feature 400 to the panel 100.

Figure 21:
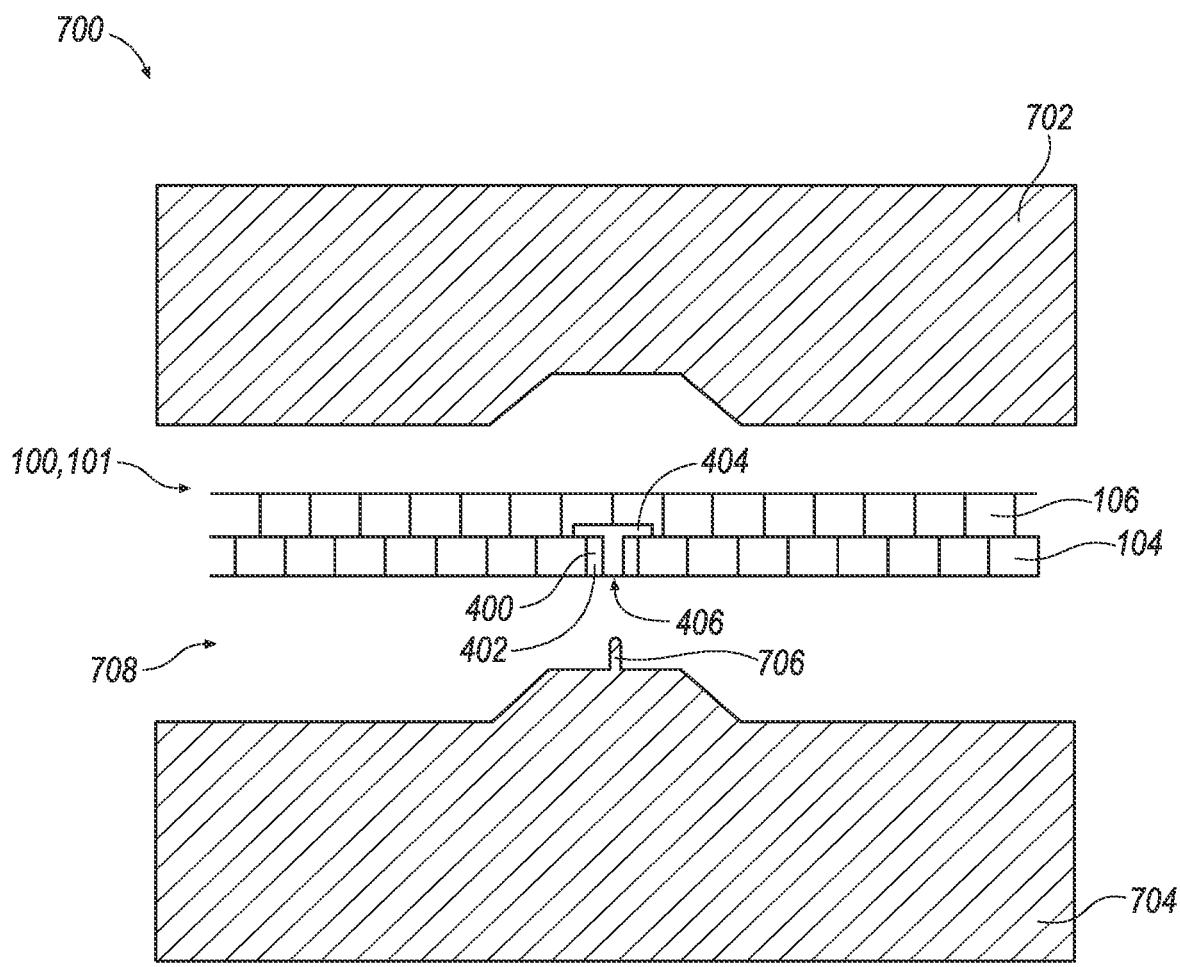
FIG. 21 is schematic cross-sectional view of a tool used in connection with manufacturing a load structure.

After step 610, the method 200 may proceed to step 612 in which the panel 100 may undergo final trimming. With reference to FIG. 21, the panel 100 may be placed in a trim tool (e.g., tool 700), which may be designed to remove any excess material such that the panel 100 is trimmed to the final footprint of the load structure 10. Step 612 may be substantially similar to and/or conducted in a similar manned as step 210 of method 200.

The tool 700 may be used in connection with the method 600 such as during step 612 and/or during additional forming steps (e.g., preforming operation). For instance, to form a panel 100 into the desire footprint of the load structure. The tool 700 may operate similar to the tool 300 used in the method 200. The tool 700 may include a first tool portion 702, a second tool portion 704 having a pin 706, and cavity 708 for receiving the panel 100 disposed between the first and second tool portions (e.g., in a closed configuration). The pin 706 may be configured to engage and/or connect with an attachment feature 400 of the panel 100 such as to ensure proper arrangement/alignment of the attachment feature 400 relative to the final footprint of the load structure.

After step 612, the method 600 may proceed to step 614, during which the panel 100 may undergo final assembly, for example, by attaching a handle, hardware, or other external feature(s) to the panel 100.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A load structure for a vehicle, comprising:
  a first honeycomb layer;

a second honeycomb layer connected to the first honeycomb layer for providing the load structure about the vehicle; and an attachment feature connected to at least one of the first honeycomb layer or the second honeycomb layer, wherein the attachment feature is one of an insert or a support structure, wherein the load structure corresponds to one of a floor panel, a roof panel, and a structural member of the vehicle, and wherein:
  the attachment feature includes a first portion and a second portion;
  the first portion is at least partially embedded within the first honeycomb layer; and
  the second portion is disposed between the first honeycomb layer and the second honeycomb layer.

2. The load structure of claim 1, wherein
the first honeycomb layer includes an outer surface;
the attachment feature is connected to the outer surface; and
the attachment feature is configured to connect with an external object.

3. The load structure of claim 1, wherein:
the first portion and the second portion of the attachment feature collectively define a T-shaped configuration;
the first portion includes an internal threaded portion; and
the internal threaded portion is configured to connect with an external object.

4. The load structure of claim 1, including an additional attachment feature.

5. The load structure of claim 4, wherein:
first portions of each of the attachment feature and the additional attachment feature are embedded within the first honeycomb layer;
second portions of each of the attachment feature and the additional attachment feature are disposed between the first honeycomb layer and the second honeycomb layer; and
the additional attachment feature is offset relative to the attachment feature along an outer surface of the first honeycomb layer.

6. The load structure of claim 1, wherein the attachment feature is disposed between the first honeycomb layer and the second honeycomb layer; and
the attachment feature is configured to reinforce the load structure.

7. The load structure of claim 1, including a third honeycomb layer connected to the second honeycomb layer, and wherein the second honeycomb layer is disposed between the first honeycomb layer and the third honeycomb layer.

8. The load structure of claim 7, wherein:
the first portion and the second portion collectively define a T-shaped configuration;
the first portion is disposed between the first honeycomb layer and the second honeycomb layer;
the second portion is at least partially embedded within the second honeycomb layer and the third honeycomb layer; and
the attachment feature is configured to add rigidity and/or structure to the load structure.

9. The load structure of claim 8, including an additional attachment feature in contact with the first portion of the attachment feature, and wherein at least a portion of the additional attachment feature is embedded within the first honeycomb layer.

10. The load structure of claim 1, wherein a foam is disposed between the first honeycomb layer and the second honeycomb layer, the foam is configured to add rigidity and/or structure to the load structure.

11. The load structure of claim 10, wherein at least a portion of the attachment feature is disposed within the foam.

12. The load structure of claim 10, wherein:
the attachment feature includes a first side and a second side spaced apart from the first side;
the first side of the attachment feature faces the first honeycomb layer; and
the second side of the attachment feature faces the foam.

13. The load structure of claim 12, including a second attachment feature and a third attachment feature, and wherein:
the second attachment feature and the third attachment feature are in contact with the first side of the attachment feature;
portions of the second attachment feature and the third attachment feature are embedded with the first honeycomb layer; and
the second attachment feature and the third attachment feature each include internal threaded portions that are configured to connect with one or more external objects.

14. The load structure of claim 10, wherein:
the attachment feature includes a portion embedded in the first honeycomb layer;
the attachment feature includes an additional portion embedded in the foam; and
the attachment feature is configured to connect with an external object.

15. A load structure, comprising:
a first honeycomb layer;
a second honeycomb layer located adjacent the first honeycomb layer for positioning the load structure about a vehicle;
a void located between the first and second honeycomb layers;
a foam located within the void; and
an attachment feature including one of an insert and a support structure connected to at least one of the first honeycomb layer or the second honeycomb layer,
wherein the load structure corresponds to one of a floor panel, a roof panel, and a structural member of the vehicle.

16. The load structure of claim 15, further comprising a reinforcement component.

17. A method of manufacturing a load structure for a vehicle, the method comprising:
providing a first honeycomb layer, a second honeycomb layer, and an attachment feature for positioning the load structure about the vehicle;
disposing an adhesive layer onto at least one of the first honeycomb layer or the second honeycomb layer;
connecting the attachment feature including one of an insert and a support structure to the first honeycomb layer or the second honeycomb layer;
disposing the first honeycomb layer onto the second honeycomb layer,
wherein the load structure corresponds to one of a floor panel, a roof panel, and a structural member of the vehicle,
providing a tool having a first and second portions, one of the first and second portions having a locator pin;
locating the load structure within the tool;

aligning the locator pin with an opening of the attachment feature; and closing the tool to form a structure load structure having a desired geometric configuration.

18. A load structure for a vehicle, comprising:

a first honeycomb layer;

a second honeycomb layer connected to the first honeycomb layer for providing the load structure about the vehicle; and an attachment feature connected to at least one of the first honeycomb layer or the second honeycomb layer, wherein the attachment feature is one of an insert or a support structure, wherein the load structure corresponds to one of a floor panel, a roof panel, and a structural member of the vehicle, and wherein a foam is disposed between the first honeycomb layer and the second honeycomb layer, the foam is configured to add one of rigidity and structure to the load structure.

19. A load structure for a vehicle, comprising:

a first honeycomb layer;

a second honeycomb layer connected to the first honeycomb layer for providing the load structure about the vehicle;

an attachment feature connected to at least one of the first honeycomb layer or the second honeycomb layer, wherein the attachment feature is one of an insert or a support structure, wherein the load structure corresponds to one of a floor panel, a roof panel, and a structural member of the vehicle, and an additional attachment feature;

wherein:

first portions of each of the attachment feature and the additional attachment feature are embedded within the first honeycomb layer;

second portions of each of the attachment feature and the additional attachment feature are disposed between the first honeycomb layer and the second honeycomb layer; and the additional attachment feature is offset relative to the attachment feature along an outer surface of the first honeycomb layer.

\* \* \* \* \*